Feb. 21, 1956 E. W. MOLLOY 2,735,947
RADIATION DETECTOR
Filed Dec. 5, 1951

INVENTOR:
EVERETT W. MOLLOY
BY HIS ATTORNEYS
HARRIS, KIECH, FOSTER & HARRIS

United States Patent Office 2,735,947
Patented Feb. 21, 1956

2,735,947
RADIATION DETECTOR

Everett W. Molloy, Wilmar, Calif., assignor to Beckman Instruments, Inc., South Pasadena, Calif., a corporation of California Application December 5, 1951, Serial No. 259,954

18 Claims. (Cl. 250—83.6)

This invention relates to devices for detecting nuclear radiations and, more particularly, refers to a portable radioactivity detector of relatively simple and inexpensive construction.

The general object of the invention is to provide a sensitive and reliable radiation detector for use by relatively unskilled operators. Such a device, for example, would be suitable for widespread use in civilian defense for scouting radioactive areas.

One important object of the invention is to provide a relatively simple electrical circuit arrangement for detecting and measuring radioactivity, which circuit arrangement may be incorporated in a relatively light portable device energized by a simple small battery source. This object is achieved largely by a circuit arrangement in which an input capacitor and an output capacitor are combined with a vacuum tube or thermionic valve to detect amplified currents generated by the effect of radiation in an ionization chamber.

It is another object of the invention to provide an extremely simple and reliable means to indicate the magnitude of the currents generated in the ionization chamber, thereby to afford a measure of the intensity of the radioactivity in the area under test. In this regard the invention is characterized by the concept of measuring the ionization current in a cumulative manner. An accumulator cycle is repeated at a frequency determined by the magnitude of the ionization current and means responsive to the accumulator cycle provides a sensible signal to indicate the frequency of the cycle.

While various signal means may be employed in various practices of the invention, an important feature of the preferred practice described herein is the use of a glow discharge tube for the dual purpose of cooperating in the accumulator cycle and of serving as a flashing signal lamp to indicate the frequency of the cycle.

A further object of the invention is to provide a detector of this character that is of simple, inexpensive construction and yet rugged and capable of withstanding both rough usage and exposure to moisture. For this purpose the presently prefered form of the invention is incorporated in an ordinary container with a removable cover. The preferred container is a tin can of the type commonly used for containing paint. The can serves not only as a housing for the detector parts, but also as the required ionization chamber and is readily sealed against moisture. Such a can provides a relatively large ionization chamber and thus permits the use of less critical components. Preferably all the parts of the detector combination are mounted on the lid of the can to facilitate initial assembly as well as to facilitate subsequent inspection and servicing of the detector. A further advantage in the use of such a container is that a damaged can body may be quickly and conveniently replaced when necessary.

The above and other advantages and objects of the invention may be found in the following detailed description, together with the accompanying drawings.

In the drawings, which are to be regarded as merely illustrative:

Figure 1:
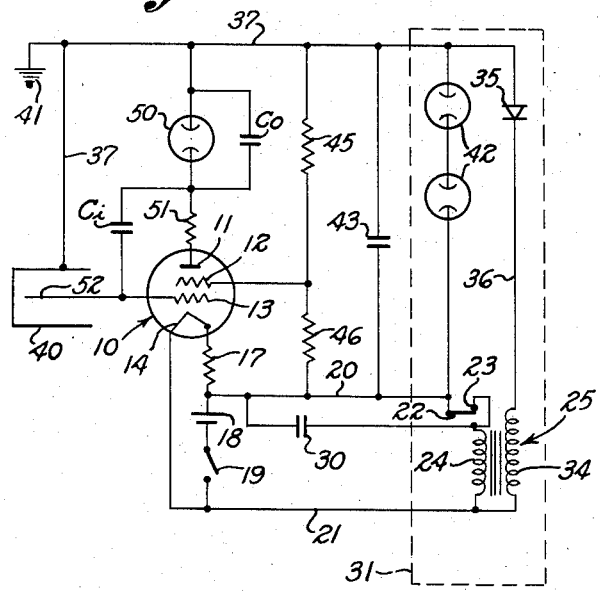
Fig. 1 is a wiring diagram of the presently preferred circuit arrangement for carrying out the invention.

In the circuit arrangement shown in Fig. 1 a tetrode 10, which may be a relatively small vacuum tube of the kind commonly employed in hearing aids, has an anode 11, screen grid 12, control grid 13 and cathode 14. The circuit for heating the filament of the tube includes a suitable resistance 17, for example a 12 ohm resistor, a battery means 18, and a switch 19.

Preferably the battery 18 is also the energy source for a plate supply voltage and for this purpose the battery means 18 and the switch 19 are shown connected by two wires 20 and 21 in series with an armature 22, a fixed contact 23 and the primary coil 24 of a step-up transformer generally designated 25. The armature 22, contact 23 and coil 24 constitute a buzzer in which energization of the coil repeatedly attracts the armature away from the contact 23 to break the circuit through the coil. A suitable capacitor 30 which may have a capacitance of 0.1 microfarad shunts the armature 22 and contact 23 and a suitable shield represented by the dotted rectangle 31 encloses the buzzer to reduce RF pickup in the detector caused by sparking at the buzzer.

The secondary coil 34 of the transformer 25, which is also connected to the wire 21 at one end, is connected at its other end to a selenium rectifier 35 by a wire 36. The rectifier 35 is connected by a wire 37 to the outer electrode or casing of an ionization chamber 40. The ionization chamber may be considered the ground for the system, as indicated diagrammatically by the ground connection 41. For the purpose of regulating the supply voltage a pair of neon tubes 42 is shown connected in series between the two wires 20 and 37 and for smoothing the supply voltage a suitable capacitor 43 which may have a capacitance of 0.1 microfarad is also connected across the supply voltage. The screen grid 12 is connected between two resistances 45 and 46 across the supply voltage. The values of these two resistors may be, for example, 43,000 ohms and 1.5 megohm, respectively.

A cyclical resetting circuit is completed by a neon tube 50 and a resistance 51 in series with the wire 37 from the plate supply voltage and the anode 11 of the vacuum tube 10. The purpose of the resetting circuit is to re-store periodically a reference condition of energy stored in an output circuit that includes what may be termed an output capacitor $C_o$ that is connected across the neon tube 50. Current flow in the output circuit is derived from potential across the anode 11 and cathode 14 of the vacuum tube. Capacitor $C_o$ is an energy-accumulating device and makes the circuit capable of storing a charge of adequate magnitude.

The control grid 13 is connected to the inner electrode 52 of the ionization chamber 40 to respond to ionization currents generated in the chamber and what may be termed an input capacitor $C_i$ is added for cooperation with the grid in controlling the output circuit. One terminal of capacitor $C_i$ is connected to the control grid 13 and the other terminal is connected between the neon tube 50 and the resistance 51.

In the preferred practice of the invention the circuit arrangement described above is mounted on the friction lid or cover 55 of a one gallon metal paint can 56 which serves as the ionization chamber 40. The cover 55 is provided with a convenient handle 57 and has mounted thereon the previously mentioned switch 19 and neon tube 50, preferably in a moisture-proof manner.

Figure 3:
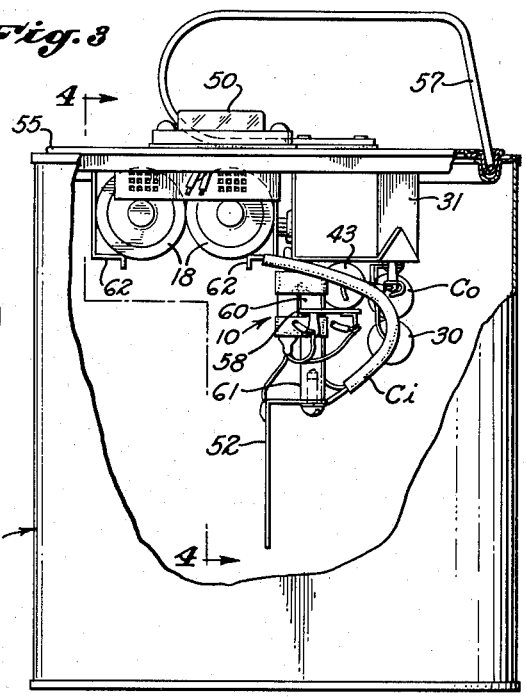
Fig. 3 is an elevational view of the same embodiment with a housing wall broken away to reveal the arrangement of parts inside the device.
Figure 4:
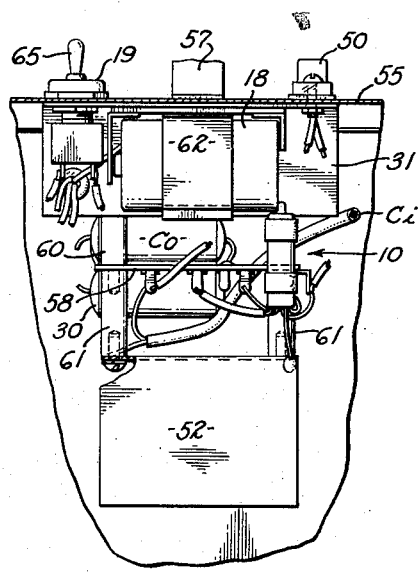
Fig. 4 is a view of the internal arrangement, partly in elevation and partly in section taken as indicated by the line 4—4 of Fig. 3.

The shield 31 for the plate supply voltage is in the form of a metal housing mounted on the inner face of the cover 55, as shown in Figs. 3 and 4. This shield also encloses the previously mentioned pair of neon tubes 42 in addition to the transformer 25 and the buzzer. The various resistances 17, 45, 46 and 51, which are omitted from Figs. 3 and 4 for the sake of clarity of illustration, are mounted on a suitable nonconducting plate 58 that is supported by two spaced posts 60 on the under side of the shield 31. The inner electrode 52 of the ionization chamber is in the form of an angular piece of sheet metal, as shown in Figs. 3 and 4, and is mounted on a pair of nonconducting posts 61 that extend downward from the plate 58. The battery means 18 is in the form of a pair of 1½ volt dry cells, as shown which are held in place on the under side of the cover 55 by a pair of flexible retaining arms 62.

Figs. 3 and 4 show the capacitors 30, 43 and $C_o$ in a group around the nonconducting plate 58 and also show the capacitor $C_1$ in the form of a short length of coaxial cable having one of its two conductors attached to the electrode plate 52 of the ionization chamber, the other conductor being connected to the vacuum tube grid.

Figure 2:
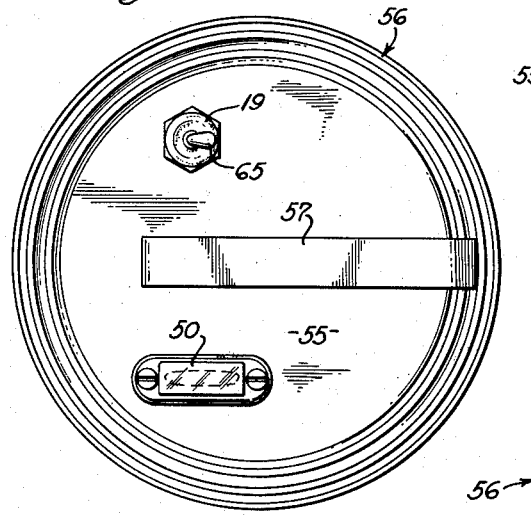
Fig. 2 is a plan view of the preferred embodiment of the invention.

As shown in Figs. 2 and 4, the switch 19 is mounted in the cover 55 and is conveniently operated by an external finger piece 65. The neon tube 50 is shown mounted on the outer face of the cover 55 for convenient observation by the operator. Preferably, both the switch 19 and the neon tube 50 are mounted on the cover in a waterproof manner and the can or ionization chamber may be made waterproof simply by wiping the rim of the can opening with petroleum jelly and then firmly seating the friction cover 55 in place.

In the operation of the detector the neon tube 50 serves as an automatic switch for cyclically resetting the charging circuit each time the output circuit reaches a predetermined level of sorted energy. It also serves as a signal means to indicate the magnitude of currents generated in the ionization chamber 40, inasmuch as the flashing frequency is proportional to these currents, and thereby indicates the intensity of the radiation to which the ionization chamber is exposed.

Assuming that the output circuit is ready for operation with an adequate voltage drop across the anode and cathode and that the resetting circuit is open, the voltage of the control grid 13 will depend upon the magnitude of the current generated in the ionization chamber. In the absence of appreciable radioactivity, the control grid 13 is sufficiently negative to cut off flow through the operating plate circuit. Some grid current flows, mainly leakage currents, since the grid is the most negative element in the vacuum tube, but such grid current is not of significant magnitude.

When ionization caused by radiation occurs, the control grid 13 responds by becoming more positive and causing current flow through the output circuit supplied by the charged capacitor $C_o$. This plate flow reacts on the control grid through the input capacitor $C_1$. The control grid seeks an equilibrium potential which varies in proportion to the strength of the ionization current generated in the ionization chamber. As a result, current flow through the output circuit varies in the same manner.

The extent to which the current generated in the ionization chamber is amplified in the responsive current flow through the output circuit is determined by the ratio of the capacitance of $C_o$ to the capacitance of $C_1$. Thus, if $I_i$ is the input current, the magnitude of the output current $I_o$ in the output circuit will be $$I_i \frac{C_o}{C_i}$$

The ratio $C_o/C_1$ may be quite high. In the present embodiment of the invention, for example, the value of $C_1$ is approximately five micromicrofarads and the value of $C_o$ is one tenth of a microfarad to give a ratio of about two thousand.

As current flows through the output circuit, the voltage at anode 11 drops and the potential difference across the output capacitor $C_o$ progressively increases and eventually the potential difference across the two anodes of the neon tube 50 rises to the firing potential of the tube. The neon tube fires and discharges the capacitor $C_o$, thereby resetting the output circuit. As soon as the neon tube fires, the potential difference across the tube drops because of impedance in series with the neon tube in the resetting circuit. The impedance includes the resistance 51 as well as the effective resistance offered by the vacuum tube 10. These impedance values are such that the potential difference across the neon tube immediately drops below the extinction potential of the tube to cause the tube to stop conducting. As a result, the action of the neon tube 50 is limited to a brief flash which raises the potential of the anode 11 and reduces the voltage drop across capacitor $C_o$ to a minimum.

It is apparent that the described detector circuit arrangement acts as an accumulator inasmuch as the current generated by ionization in the ionization chamber has an accumulative effect in changing the charge stored in the capacitor $C_o$. Since the time required to change the charge stored in the output circuit to a given extent varies with the totalized or integrated input current generated in the ionization chamber, and since the neon tube 50 restores the energy in the output circuit to a predetermined maximum magnitude whenever that energy changes to a predetermined magnitude, it follows that the frequency of the cycle of reset and discharge of the output circuit will vary in proportion to the magnitude of the input current generated by the ionization chamber. Thus, the frequency of the flashes of the neon tube 50 will indicate the intensity of the radioactivity under test.

With the various components of the circuit arrangement having the values heretofore specified, a radiation intensity of 1 Roentgen per hour will cause the neon tube 50 to flash once per second. One flash every ten seconds indicates one-tenth Roentgen per hour and ten flashes per second indicates ten Roentgens per hour. Intensities as low as 100 mr. or as high as 20 R. per hour can be easily determined. It is apparent that the test procedure is so simple that no special skill nor technical training is required on the part of the operator.

The above detailed description of the presently preferred practice of the invention will suggest to those skilled in the art various changes, substitutions and other departures from this particular disclosure.

I claim as my invention:

1. In a circuit for indicating the magnitude of an electronic signal, the combination of: an amplifier having an input control element for communication with the signal; an output circuit for said amplifier including capacitance for establishing a voltage drop in the circuit to cause current flow therein with the capacitance a factor in determining the magnitude of such current flow; an input capacitor having one side connected to said input control element and the other side connected with said output circuit on the positive side of said amplifier; and automatic means to apply a predetermined voltage to said output circuit momentarily to re-establish said voltage drop whenever the voltage drop diminishes to a predetermined magnitude, said automatic means being adapted to give a sensible signal whereby the frequency of the sensible signal varies with the magnitude of the electronic signal.

2. In a circuit for indicating the magnitude of an electronic signal, the combination of: an amplifier having an input control element for communication with the signal; an output circuit for said amplifier including capacitance for establishing a voltage drop in the circuit to cause current flow therein with the capacitance a factor in determining the magnitude of such current flow; an input capacitor having one side connected to said input control element and the other side connected with said output circuit on the positive side of said amplifier; means to restore said voltage drop to a predetermined magnitude in response to diminishing of the voltage drop to a predetermined minimum magnitude; and means to provide a sensible signal in response to operation of said responsive means whereby the frequency of the sensible signal varies with the magnitude of the electronic signal.

3. In a circuit for indicating the magniture of an electronic signal, the combination of: an amplifier having an input control element for communication with the signal; an output circuit for said amplifier including capacitance for establishing a voltage drop in the circuit to cause current flow therein with the capacitance a factor in determining the magnitude of such current flow; an input capacitor having one side connected to said input control element and the other side connected with said output circuit on the positive side of said amplifier; and automatic means including a signal lamp to restore the voltage drop in said output circuit to a predetermined magnitude whenever the voltage drop diminishes to a predetermined minimum magnitude whereby the frequency of energization of said signal lamp indicates the magnitude of said electronic signal.

4. In a circuit for indicating the magnitude of an electronic signal, the combination of: an amplifier having an input control element for communication with the signal; a resetting circuit; an output circuit for said amplifier connected at a point on its positive side with the positive side of said resetting circuit and connected on the negative side of said amplifier with the negative side of said resetting circuit, said output circuit including an output capacitor between said point and the positive side of said amplifier to permit a relatively large initial voltage drop of a given magnitude to be established across said amplifier and a relatively small initial voltage drop of a given magnitude to be established across said capacitor for current flow through the amplifier with consequent decrease in the voltage drop across the amplifier and increase in the voltage drop across the capacitor; an input capacitor having one side connected to said input control element and the other side connected with said output circuit on the positive side of said amplifier; restoring means responsive to a predetermined change of one of said voltage drops from its initial magnitude to shunt said output capacitor momentarily to restore both said voltage drops to their initial magnitudes; and signal means responsive to said restoring means whereby the frequency of operation of the signal means indicates the magnitude of the electronic signal.

5. In a circuit for indicating the magnitude of an electronic signal, the combination of: an amplifier having an input control element for communication with the signal; a reseting circuit; an output circuit for said amplifier connected at a point on its positive side with the positive side of said resetting circuit and connected on the negative side of said amplifier with the negative side of said resetting circuit, said output circuit including an output capacitor between said point and the positive side of the amplifier to permit a relatively large initial voltage drop of a given magnitude to be established across said amplifier and a relatively small initial voltage drop of a given magnitude to be established across said capacitor for current flow through the amplifier with consequent decrease in the voltage drop across the amplifier and increase in the voltage drop across the capacitor; an input capacitor having one side connected to said input control element and the other side connected with said output circuit on the positive side of said amplifier; and a glow discharge tube in said resetting circuit connected in parallel with said first mentioned capacitor to conduct in response to rise in the potential drop across the capacitor to a given maximum value, thereby to operate the resetting circuit to restore both said voltage drops to their initial values, said glow discharge tube being adapted for observation of light emanated therefrom whereby the frequency of energization of the glow discharge tube may be observed to ascertain the magnitude of the electronic signal.

6. A portable radiation detector of the character described, comprising: a housing adapted to be carried manually to serve both as an ionization chamber and as an enclosure for the detector parts; a removable closure for said housing; an inner electrode for the ionization chamber mounted on the inner side of said closure; a detector circuit mounted on the inner side of said closure including a vacuum tube with its grid in communication with said inner electrode; signal means on said closure responsive to said detector circuit; and voltage supply means on the inner side of said closure for energizing said detector circuit.

7. A radiation detector of the character described, comprising: an ionization chamber having a removable wall; an amplifier and voltage supply means therefor mounted on said wall, said amplifier including a thermionic valve having a grid; an electrode for the ionization chamber mounted on said wall, said electrode being connected to said grid; and indicating means responsive to operation of said amplifier to indicate the rate of ionization in said chamber, said indicating means being mounted on said wall.

8. A radiation detector as set forth in claim 7 in which said indicating means is a flashing glow discharge tube operated by said amplifier to flash with changing frequency in accord with changes in the rate of ionization in said chamber.

9. A radiation detector as set forth in claim 6 in which said chamber is in the form of a metal can and said removable wall is the lid of the can.

10. A portable radiation detector comprising: an ionization chamber with an inner electrode; a thermionic valve having an anode, cathode and grid, said grid being connected with said electrode; a capacitor connected between said anode and grid; means including a second capacitor in series with said cathode and anode to form therewith an output circuit; automatic means to lower the potential across said second capacitor to a given minimum magnitude in response to rise of the potential to a given maximum magnitude thereby to raise the voltage of said anode to a given maximum whenever the voltage drops to a given minimum; and means to provide a sensible signal in response to operation of said automatic means, whereby the frequency of the sensible signal varies with the rate of ionization in said chamber.

11. A portable radiation detector comprising: an ionization chamber with an inner electrode; a thermionic valve having an anode, cathode and grid, said grid being connected with said electrode; a relatively small capacitor connected between said anode and grid; a second relatively large capacitor forming an output circuit in combination with said cathode and anode capable of storing an electric charge with minimum voltage drop across said second capacitor for amplified current flow controlled by said grid; means to reduce the voltage drop across said second capacitor to said minimum magnitude whenever the voltage drop increases to a given maximum magnitude whereby the frequency of the cycle of reduction and restoration of said charge will vary with the rate of ionization in said chamber; and signal means responsive to said cycle.

12. A portable radiation detector comprising: an ionization chamber with an inner electrode; a thermionic valve having an anode, cathode and grid, said grid being connected with said electrode; a relatively small capacitor connected between said anode and grid; a second relatively large capacitor forming an output circuit in combination with said cathode and anode capable of storing an electric charge with a minimum voltage drop across the capacitor for amplified current flow controlled by said grid; and a resetting circuit to reduce the voltage drop across said second capacitor to said minimum, said resetting circuit including a glow discharge tube connected in parallel with said second capacitor to fire in response to rise in potential across said second capacitor to a given magnitude, said resetting circuit including impedance to lower the potential across the conducting tube to the extinction potential of the tube whereby the charging circuit closes only briefly with a corresponding brief flash by said tube whereby the frequency of the flashes of said tube varies with the rate of ionization in said chamber, said glow discharge tube being positioned for observation of said flashes by the operator of the detector.

13. A portable radiation detector comprising: an ionization chamber with an inner electrode; a thermionic valve having an anode, cathode and grid, said grid being connected with said electrode; a relatively small capacitor connected between said anode and grid; means including a relatively large capacitor in series with said cathode and anode forming an output circuit capable of storing a charge with a minimum voltage drop across the large capacitor; a resetting circuit to reduce the voltage drop across said large capacitor to said minimum, said resetting circuit including a battery, converter and rectifier; means to apply said resetting circuit to said large capacitor in response to increase of said voltage drop to a given maximum magnitude; and signal means responsive to operation of said resetting circuit, whereby the frequency of operation of the signal means varies with the rate of ionization in said chamber.

14. A radiation detector as set forth in claim 13 in which said signal means is in the form of a lamp.

15. A radiation detector as set forth in claim 14 in which said lamp is a glow discharge tube positioned in said charging circuit to function as a switch in response to lowering of the charge on said output circuit.

16. In a radiation detector, the combination of: an ionization chamber having an electrode; an electron tube having a cathode, a control grid and a plate, said control grid being connected to said electrode; an input capacitor connected between said electrode and said plate; an output capacitor connected between said plate and said cathode; and a discharge device connected in parallel with said output capacitor.

17. The radiation detector defined in claim 16 wherein said electron tube and said capacitors are disposed within said ionization chamber and wherein said discharge device is sensible from the exterior of said ionization chamber.

18. A radiation detector as defined in claim 17 wherein said discharge device is a glow discharge lamp.

References Cited in the file of this patent

UNITED STATES PATENTS

| | | |
|---|---|---|
| 2,346,043 | Mysels | Apr. 4, 1944 |
| 3,365,855 | Atlee | Dec. 26, 1944 |
| 2,401,723 | Deming | June 11, 1946 |
| 2,437,913 | Frondel | Mar. 16, 1948 |
| 2,574,000 | Victoreen | Nov. 6, 1951 |
| 2,617,044 | Neher | Nov. 4, 1952 |
| 2,696,564 | Ohmart | Dec. 7, 1954 |